United States Patent Office 3,317,383
Patented May 2, 1967

3,317,383
DECONGESTIVE COMPOSITIONS AND METHOD
Ove Birger Fernö, Knut Bertil Högberg, and Torsten Ove Enok Linderot, all of Halsingborg, Sweden, assignors to Aktiebolaget Leo (A/B Leo), Halsingborg, Sweden
No Drawing. Filed Apr. 23, 1964, Ser. No. 362,165
Claims priority, application Great Britain, May 1, 1963, 17,242/63
13 Claims. (Cl. 167—58)

This invention relates to a medicinal composition having particular utility for the treatment of rhinitis. The composition in accordance with this invention has a high degree of decongestive action on nasal mucosas with rhinitic disorders without showing any serious side-effects. The active ingredient provides for a prolonged therapeutic effect.

Compositions with a decongestive effect on nasal mucosas with rhinitic disorders are well-known in the art, e.g. hydrocortisone (and related compounds) together with a sympathomimetic amine. Compounds of the hydrocortisone group show, however, disagreeable side-effects in the respect that they inhibit the natural defence mechanism of the tissue against infection. Further the duration of the anti-rhinitic effect of such compositions is rather limited. On account of this a composition with the beneficial effects of formerly known decongestive preparations but without their disadvantageous side-effect has been considered highly desirable. We have now surprisingly shown that certain high-molecular weight, antienzymatic compounds show a decongestive effect on the nasal mucosa while at the same time they do not give rise to the undesirable side-effects mentioned above. The decongestive effect is even superior to that obtained with hitherto known compositions. In addition our compounds show a protracted effect superior to previously known compositions. Further they are non-toxic, especially when administered topically and to nasal mucosa.

The composition of this invention has as its essential active ingredient a high molecular weight, anti-enzymatic organic compound as represented by condensation products, wherein polyhydric acid radicals represented by phosphoric acid radicals and thiophosphoric acid radicals are interconnected through radicals of aromatic compounds represented by (1) mono-, di- and polynuclear aromatic compounds carrying at least two reactive groups in meta-position at the same nucleus,
(2) mono-, di-, and polynuclear aromatic compounds carrying at least two reactive groups in para-position at the same nucleus,
(3) di- and polynuclear aromatic compounds carrying at least two reactive groups at different nuclei, said reactive groups, being represented by —OH, —SH and $NH_2$ groups, and the linkings to said polyhydric acid radicals being through the polyvalent atom of said reactive group, the said condensation products containing free hydroxy groups linked to phosphorous atoms of said phosphoric acid and thiophosphoric acid groups, and being soluble in water at alkaline pH and having a molecular weight of about 2,000 to about 50,000 preferably about 2,000 to about 25,000. To further enhance the therapeutic effect an effective amount of sympathomimetic amines and antibiotics may be present. By the term "sympathomimetic amines" is meant the amines themselves as well as pharmaceutically acceptable salts thereof. They may be present in the form of pharmaceutically acceptable organic or inorganic salts, such as hydrochloride, hydrobromide, phosphate, sulphate, nitrate, acetate, quinate, methanesulfonate, ethanesulfonate, lactate, citrate, tartrate, maleate and pamoate. Other acid addition salts are equally suitable and may be employed if desired. As examples of sympathomimetic amines can be mentioned phenylephrine, methoxamine, cyclopentadrine, naphazoline, tetrahydrozoline, xylometazoline (otrivin), hydroxyamphetamine, cyclopentamine, mephentermine, methylhexaneamine and phenylpropylmethylamine and especially phenylephrine. As examples of antibiotics that are useful in the present invention can be mentioned amphomycin, bacitracin, erythromycin, chloramphenicol, neomycin, polymyxin, tetracyclins and tyrothricin. Also other pharmacologically active ingredients such as antihistamines or the like may be added without departing from the spirit of the present invention.

A more detailed description of the production of the molecular weight, antienzymatic organic compounds used in the composition according to the present invention is given in our British specifications Nos. 700,761, 753,319 and 757,800. They have been recognized as effective antienzymatic agents, e.g. anti-hyaluronidase agents, and this effect has previously been exploited in prolonging the activity of ACTH compositions. Certain of these active agents have also been suggested for use in the treatment of edema of certain types, as in the treatment of burns, or in the treatment of peritonitis, in which cases it has been thought to exert an effect upon capillary permeability when applied topically or injected locally. However, to the best of our knowledge, none of these active ingredients have been previously suggested for use in the treatment of nasal congestion or for any method involving application to nasal mucosa or otherwise for use in connection with any rhinitic disorder.

Particularly useful for the composition of this invention are the polymers, the monomer of which is represented by a polyhydroxybenzene with at least two non-adjacent OH-radicals and the polymers represented by the group polyphloretin phosphate, polymethylphloretin phosphate, polyquercetin phosphate, polynaringenin phosphate and polyhesperetin phosphate as well as the glucosides of these.

Even more particularly useful are polyhesperidin phosphate, polyphloretin phosphate, polyquercetin phosphate and polyphloroglucinol phosphate.

A further object of this invention is to provide a method for the topical treatment of manifestations of rhinitic disorders of the nasal mucosa which comprises administering an effective amount, e.g. from about 0.01 to about two milligrams preferably about 0.05 to one milligram of a high molecular weight, anti-enzymatic organic compound as defined above, either alone or together with an amount of a sympathomimetic amine so that the ratio by weight between this compound and the high molecular weight, anti-enzymatic compound lies between zero and ten to one, preferably between zero and two to one, together with a non-toxic pharmaceutical carrier or diluent.

Preparations of polyphloretin phosphate alone and polyphloretin phosphate plus sympathomimetic amines have been tested in patients suffering from rhinitis using an objective method of registration. The resistance of a standardized stream of air through the nasal passages was measured in a double blind study in five groups of 18 patients each and the effect was checked by inspection of the mucuous membranes and by interviewing the patients.

Results:

| Preparation | Decongestive action | | | Protracted effect >2 hours in No. of cases |
|---|---|---|---|---|
| | Very good | Good | Slight | |
| | No. of cases | | | |
| A. Polyphloretin phosphate, 0.1%, in water | 11 | 2 | 5 | 13 |
| B. Hydroxyamphetamine HBr, 0.5% plus phenylephrine HCl, 0.125%, in water | | 5 | 13 | 0 |
| C. A plus B | 11 | 6 | 1 | 16 |
| D. Polyphloretin phosphate, 0.2% plus phenylephrine HCl, 0.25%, in water | 12 | 5 | 1 | 17 |
| E. Hydrocortisone, 0.02% plus B, in water | | 9 | 9 | 5 |

As can be seen, A produced a considerably better decongestive action than B and also a better effect than E. The beneficial effect of the sympathomimetic amines is also clearly indicated in C when compared to A and B.

An additional effect of the solutions containing polyphloretin phosphate was that the tenacious secretions became more fluid, an effect that is considered a therapeutic advantage.

The above-mentioned favourable effects of polyphloretin phosphate have also been clinically confirmed in about 300 outpatients.

Because of the non-absorbability of the high-molecular weight, antienzymatic compound, no side-effects are likely to occur. Nor have any such side effects been reported in clinical trials. Similar results as reported above have been obtained with polyphloroglucinol phosphate, polyquercetin phosphate and polyhesperidin phosphate.

The active ingredient(s) are administered in the form of a solution, preferably an aqueous solution, or a self-propelled aerosol composition. Exemplary of suitable vehicles are isotonic saline solutions, isotonic dextrose solutions, isotonic buffer solutions and propellants such as lower alkanes and the halogen derivatives of these. For maximum stability of the high molecular weight, antienzymatic compound, the preparation should desirably have a pH of 7.0 or less.

The selected high molecular weight, antienzymatic compound may be present in the composition of this invention in an amount of from about 0.002% to about 2.0% by weight of the preparation and advantageously from about 0.005% to about 1.0% by weight of the preparation. The sympathomimetic amines and antibiotics may be present in amounts that are usual for decongestive, nasal preparations.

The following examples are given by way of illustration only and are not to be construed as limiting:

*Example 1*

| | Percent w./v. |
|---|---|
| Polyphloretin phosphate, sodium salt | 0.100 |
| Glycerol | 7.650 |
| Ethylenediaminetetraacetic acid, disodium salt | 0.100 |
| Sodium citrate | 0.100 |
| Saccharin sodium | 0.020 |
| Eucalyptol | 0.009 |
| Phenylmercuric nitrate, basic | 0.001 |
| Ethyl alcohol | 0.900 |
| Water q.s. to make total volume of 100 cc. | |

The basic phenylmercuric nitrate is dissolved in water with the aid of a little heat. The ethylenediaminetetraacetic acid disodium salt, sodium citrate and the saccharin sodium are dissolved while cooling, whereupon the polyphloretin phosphate sodium salt is added with stirring. The eucalyptol dissolved in the ethyl alcohol is added followed by the glycerol. The thus mixed ingredients are then filtered and sufficient water added to make the total volume equal to 100 cc.

*Example 2*

| | Percent w./v. |
|---|---|
| Polyphloretin phosphate, sodium salt | 0.200 |
| Phenylephrine HCl | 0.250 |
| Glycerol | 7.650 |
| Ethylenediaminetetraacetic acid, disodium salt | 0.100 |
| Sodium citrate | 0.100 |
| Saccharin sodium | 0.020 |
| Eucalyptol | 0.009 |
| Phenylmercuric nitrate, basic | 0.001 |
| Ethyl alcohol | 0.900 |
| Water q.s. to make total volume of 100 cc. | |

The procedure set forth in Example 1 is followed. The phenylephrine HCl is added just before the eucalyptol.

*Example 3*

| | Percent w./v. |
|---|---|
| Polyphloretin phosphate, sodium salt | 0.050 |
| Phenylephrine tartrate | 0.100 |
| Glycerol | 7.650 |
| Ethylenediaminetetraacetic acid, disodium salt | 0.100 |
| Disodium phosphate 2 $H_2O$ | 0.05 |
| Saccharin sodium | 0.01 |
| Cyclamate sodium | 0.1 |
| Eucalyptol | 0.009 |
| Phenylmercuric nitrate, basic | 0.001 |
| Ethyl alcohol | 0.900 |
| Water q.s. to make total volume of 100 cc. | |

The procedure set forth in Example 2 is followed, the sodium citrate being replaced by disodium phosphate 2 $H_2O$. The cyclamate sodium is added together with the saccharin sodium.

*Example 4*

| | Percent w./v. |
|---|---|
| Polyphloretin phosphate, sodium salt | 1.000 |
| Phenylephrine maleate | 0.100 |
| Sorbitol | 7.650 |
| Ethylenediaminetetraacetic acid, disodium salt | 0.100 |
| Potassium biphtalate | 0.060 |
| Saccharin sodium | 0.020 |
| Menthol | 0.008 |
| Thimerosal N.F. | 0.001 |
| Ethyl alcohol | 0.900 |
| Water q.s. to make total volume of 100 cc. | |

The procedure set forth in Example 2 is followed, the sodium citrate being replaced by potassium phtalate, the basic phenylmercuric nitrate by thimerosal and the eucalyptol by menthol.

*Example 5*

| | Percent w./v. |
|---|---|
| Polyphloretin phosphate, sodium salt | 0.500 |
| Phenylephrine HCl | 0.250 |
| Ethylenediaminetetraacetic acid, disodium salt | 0.100 |
| Dextrose | 4.000 |
| Saccharin sodium | 0.020 |
| Eucalyptol | 0.009 |
| Phenylmercuric nitrate, basic | 0.001 |
| Ethyl alcohol | 7.000 |
| Water q.s. to make total volume of 100 cc. | |

The procedure set forth in Example 2 is followed, the sodium citrate being replaced by dextrose and the glycerol being omitted.

Example 6

| | Percent w./v. |
|---|---|
| Polyphloretin phosphate, sodium salt | 0.200 |
| Phenylephrine HCl | 0.250 |
| Sorbitol | 7.650 |
| Ethylenediaminetetraacetic acid, disodium salt | 0.100 |
| Sodium acetate | 0.040 |
| Saccharin sodium | 0.020 |
| Eucalyptol | 0.009 |
| Phenylmercuric nitrate, basic | 0.001 |
| Polyoxyethylene sorbitan monolaurate (Tween 20, Atlas) | 0.090 |
| Water q.s. to make total volume of 100 cc. | |

The procedure set forth in Example 2 is followed, the glycerol being replaced by sorbitol, the sodium citrate by sodium acetate and the ethyl alcohol by Tween 20.

Example 7

| | Percent w./v. |
|---|---|
| Polyphloretin phosphate | 0.200 |
| Phenylephrine HCl | 0.250 |
| Eucalyptol | 0.009 |
| Dipropyleneglycol | 20.000 |
| 1,2-dichloro-1,1,2,2, tetrafluoroethane (Freon 114) to make total volume of 100 cc. | |

The phenylephrine HCl and the eucalyptol are dissolved in the dipropyleneglycol, the polyphloretin phosphate is pulverized and dispersed in the solution. This mixture is then added to the Freon 114, which is kept at −25° C., and mixed.

Example 8

| | Percent w./v. |
|---|---|
| Polyphloretin phosphate, sodium salt | 0.100 |
| Phenylephrine HCl | 0.125 |
| Hydroxy-amphetamine HBr | 0.500 |
| Glycerol | 7.650 |
| Ethylenediaminetetraacetic acid, disodium salt | 0.100 |
| Sodium citrate | 0.100 |
| Sacharin sodium | 0.020 |
| Eucalyptol | 0.009 |
| Phenylmercuric nitrate, basic | 0.001 |
| Ethyl alcohol | 0.900 |
| Water q.s. to make total volume of 100 cc. | |

The procedure set forth in Example 2 is followed. The hydroxyamphetamine HBr is added together with the phenylephrine HCl.

Example 9

| | Percent w./v. |
|---|---|
| Polyphloroglucinol phosphate, sodium salt | 0.100 |
| Glycerol | 7.650 |
| Ethylenediaminetetraacetic acid, disodium salt | 0.100 |
| Sodium citrate | 0.100 |
| Saccharin sodium | 0.020 |
| Eucalyptol | 0.009 |
| Phenylmercuric nitrate, basic | 0.001 |
| Ethyl alcohol | 0.900 |
| Water q.s. to make total volume of 100 cc. | |

The procedure set forth in Example 1 is followed.

Example 10

| | Percent w./v. |
|---|---|
| Polyquercetin phosphate, sodium salt | 0.300 |
| Glycerol | 7.650 |
| Ethylenediaminetetraacetic acid, disodium salt | 0.100 |
| Sodium citrate | 0.100 |
| Saccharin sodium | 0.020 |
| Eucalyptol | 0.009 |
| Phenylmercuric nitrate, basic | 0.001 |
| Ethyl alcohol | 0.900 |
| Water q.s. to make total volume of 100 cc. | |

The procedure set forth in Example 1 is followed.

Example 11

| | Percent w./v. |
|---|---|
| Polyhesperidin phosphate, sodium salt | 0.500 |
| Glycerol | 7.650 |
| Ethylenediaminetetraacetic acid, disodium salt | 0.100 |
| Sodium citrate | 0.100 |
| Saccharin sodium | 0.020 |
| Eucalyptol | 0.009 |
| Phenylmercuric nitrate, basic | 0.001 |
| Ethyl alcohol | 0.900 |
| Water q.s. to make total volume of 100 cc. | |

The procedure set forth in Example 1 is followed.

The high order of activity of the active agents of the present invention and compositions thereof, as evidenced by tests on human beings, is indicative of utility based on their valuable activity in lower animals as well as in human beings. Clinical evaluation in human beings has not yet been completed. It will be clearly understood that the distribution and marketing of any compound or composition falling within the scope of the present invention for use in human beings will of course have to be predicated upon prior approval by governmental agencies, such as the General Medical Council which are responsible for and authorized to pass judgment on such questions.

We claim:

1. A nasal decongestive composition comprising an effective amount of a sympathomimetic amine and, as a nasal decongestive ingredient,
   an effective amount, between about 0.002 and 2.0%, by weight, of a high-molecular weight, antienzymatic organic compound selected from the class consisting of polyphloretin phosphate, polyphloroglucinol phosphate, polyquercetin phosphate, and polyhesperidin phosphate,
   the ratio by weight between the sympathomimetic amine and the high molecular weight compound being between zero and ten to one, and a non-toxic pharmaceutical diluent.

2. A pharmaceutical composition having nasal decongestive properties which are useful in preventing and inhibiting rhinitic disorders of the nasal mucosa, containing about 0.05% to about 1.0% by weight of a mixture of a high molecular weight, antienzymatic organic compound as defined in claim 1 and a sympathomimetic amine, the ratio by weight between the sympathomimetic amine and the high molecular weight compound being between zero and two to one.

3. A pharmaceutical composition having nasal decongestive properties and containing an effective amount, between about 0.002 and 2.0% by weight of polyphloretin phosphate and phenylephrine, the ratio by weight between the polyphloretin phosphate and the phenylephrine being between zero and ten to one, and a non-toxic pharmaceutical diluent.

4. A pharmaceutical composition having nasal decongestive properties and containing an effective amount, between about 0.05 and 1.0% by weight, of polyphloretin phosphate and phenylephrine, the ratio by weight between the polyphloretin phosphate and the phenylephrine being between zero and two to one, and a non-toxic pharmaceutical diluent.

5. A method of inducing decongestion of the nasal mucosa, which comprises the administration to congested nasal mucosa of an effective quantity of a high-molecular weight, antienzymatic organic compound selected from the class consisting of polyphloretin phosphate, polyphloroglucinol phosphate, polyquercetin phosphate, and polyhesperidin phosphate.

6. A method of inducing decongestion of the nasal mucosa which comprises the administration to congested nasal mucosa of an effective quantity of about 0.01 to about two milligrams of a high molecular weight, antienzymatic organic compound as defined in claim 5.

7. A method of inducing decongestion of the nasal mucosa which comprises the administration to congested nasal mucosa of an effective quantity of about 0.05 to about one milligram of a high molecular weight, antienzymatic organic compound as defined in claim 5.

8. The method of preceding claim 5, wherein the nasal decongestive agent is administered in combination with a pharmaceutically acceptacle carrier therefor.

9. A method of including decongestion of the nasal mucosa, which comprises the administration to congested nasal mucosa of an effective quantity of a mixture of an effective amount of a sympathomimetic amine together with a high molecular weight, antienzymatic organic compound selected from the class consisting of polyphloretin phosphate, polyphloroglucinol phosphate, polyquercetin phosphate, and polyhesperidin phosphate.

10. A method of inducing decongestion of the nasal mucosa, which comprises the administration to congested nasal mucosa of an effective quantity of about 0.01 to about two milligrams of a mixture of a high molecular weight, antienzymatic organic compound as defined in claim 9 and a sympathomimetic amine; the ratio by weight between the sympathomimetic amine and the high molecular weight compound being between zero and ten to one.

11. A method of inducing decongestion of the nasal mucosa, which comprises the administration to congested nasal mucosa of an effective quantity of about 0.05 to about one milligram of a mixture of a high molecular weight, antienzymatic organic compound as defined in claim 9 and a sympathomimetic amine; the ratio by weight between the sympathomimetic amine and the high molecular weight compound being between zero and two to one.

12. A method of inducing decongestion of the nasal mucosa, which comprises the administration to congested nasal mucosa of an effective quantity of a mixture of polyphloretin phosphate and phenylephrine.

13. The method of preceding claim 12, wherein the nasal decongestive agents are administered in combination with a pharmaceutically acceptable carrier therefor.

References Cited by the Examiner

UNITED STATES PATENTS

| | | | |
|---|---|---|---|
| 2,794,763 | 6/1957 | Pinson et al. | 167—58.2 |
| 2,962,515 | 11/1960 | Diczfalusy et al. | 260—461 |

OTHER REFERENCES

Chemical Abstracts, vol. 42, entry 6407g, 1948, citing Bergquist et al., Acta. Path. Microbiol. Scand. 25, 255–8 (1948).

Chemical Abstracts, vol. 48, entry 10216e, 1954, citing Zanussi et al., Boll. 1st. Sieroterap. Milan., 32, 406–13 (1953).

Chemical Abstracts, vol. 50, entry 15663b, 1956, citing Eufinger et al., Langenbecks Arch. Klin. Chir. 281, 573–82 (1956).

LEWIS GOTTS, *Primary Examiner.*

RICHARD L. HUFF, *Assistant Examiner.*